Figure 6A:
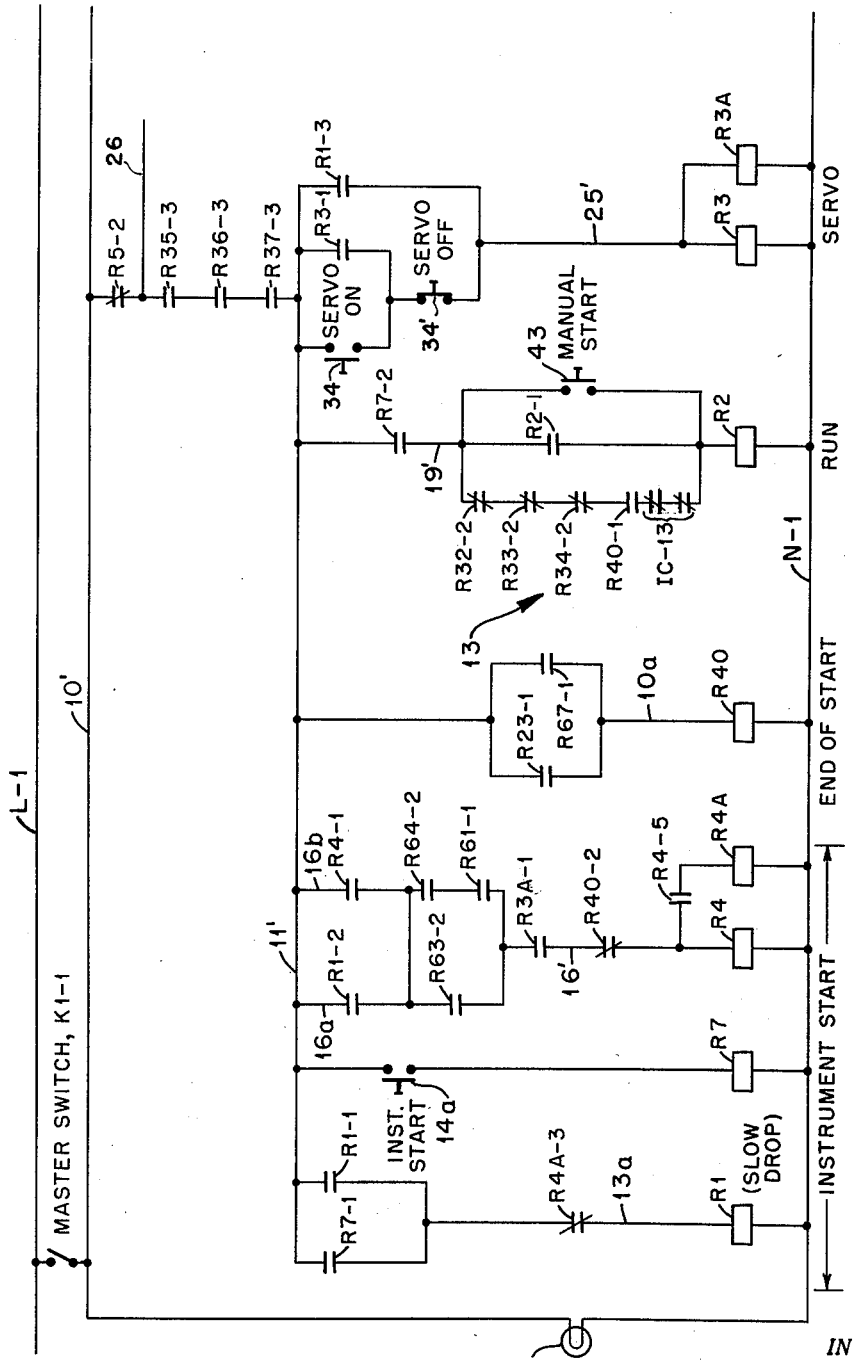

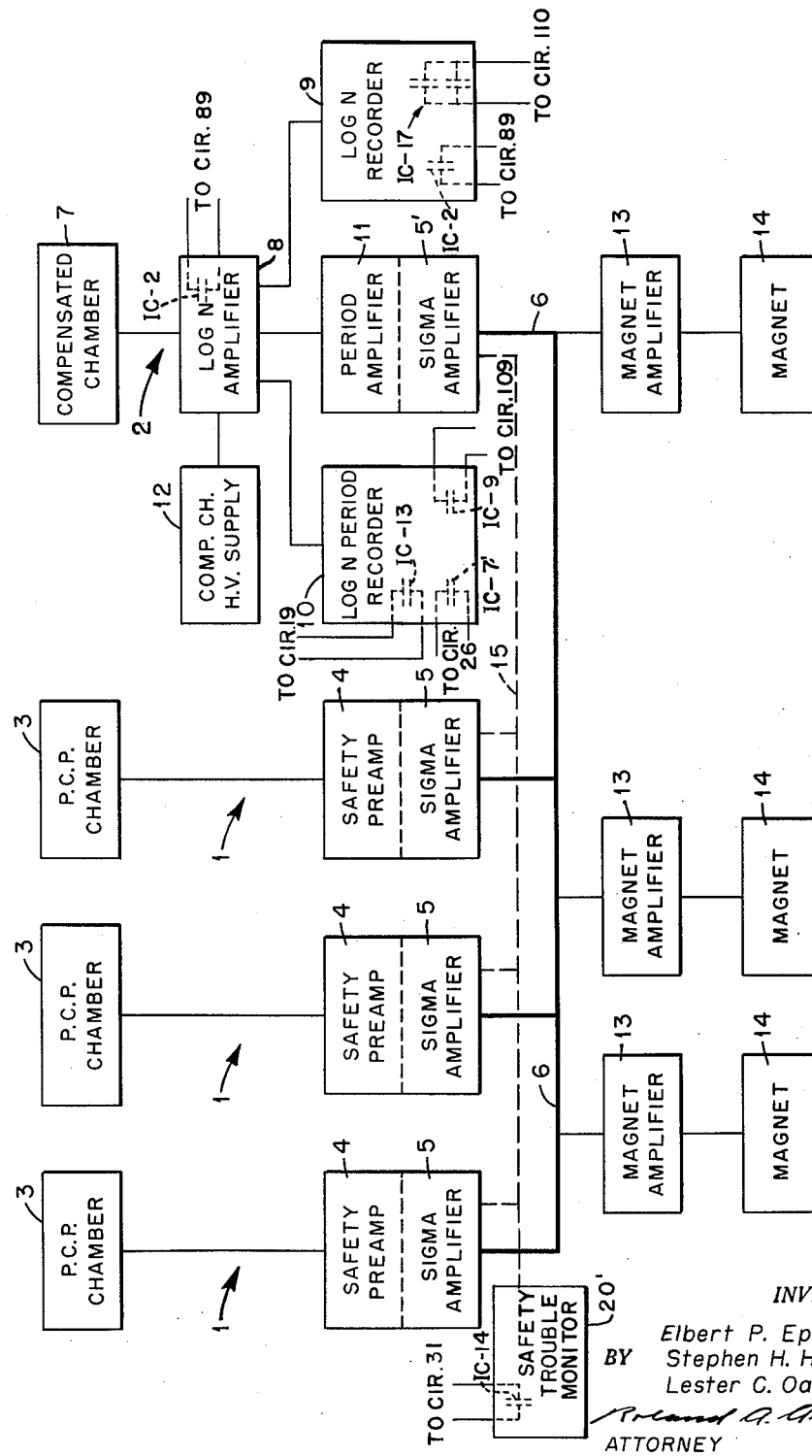

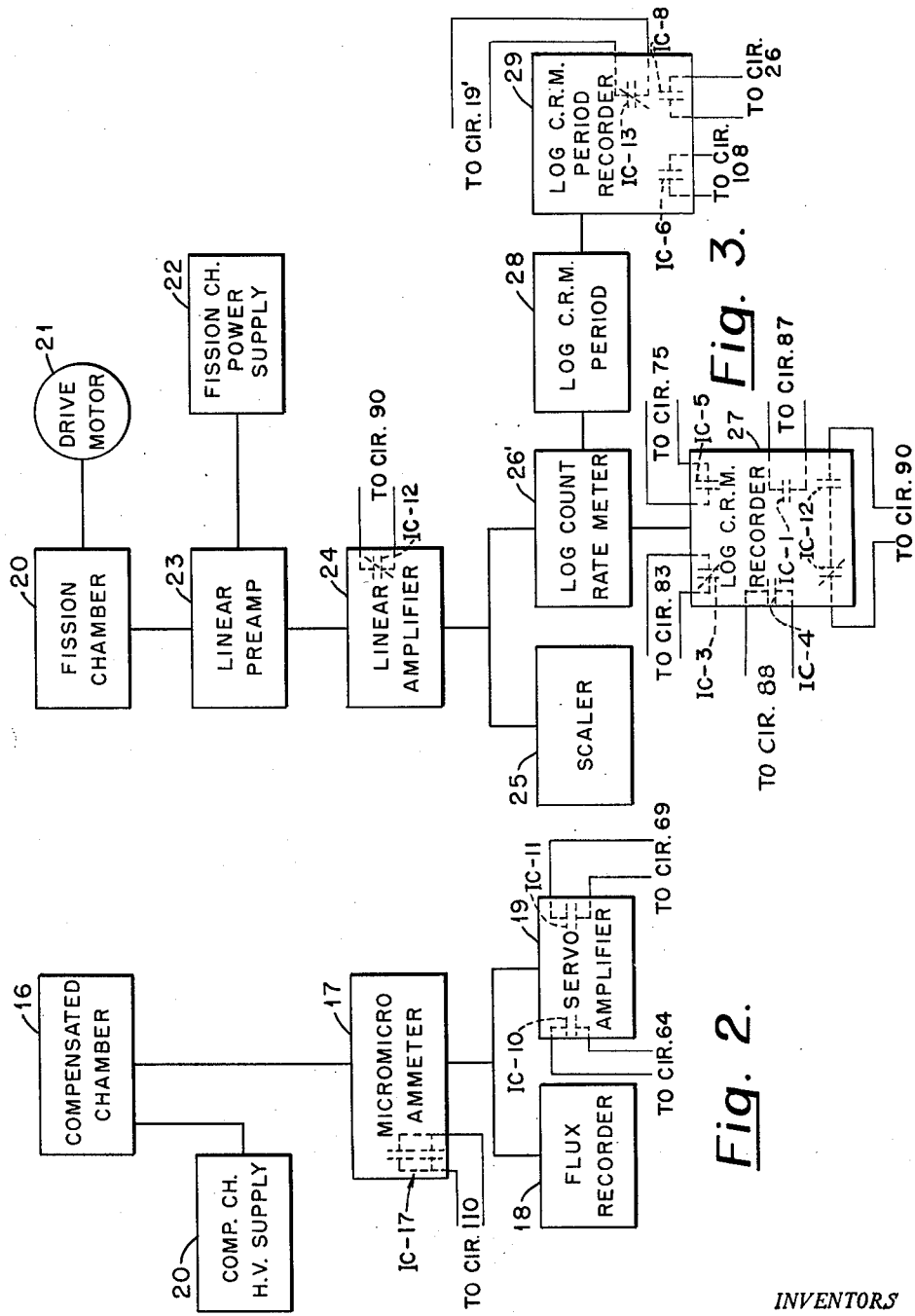

Nov. 3, 1959     E. P. EPLER ET AL     2,911,344
NUCLEAR REACTOR CONTROL SYSTEM
Filed Aug. 15, 1956     9 Sheets-Sheet 3

| LIMIT SWITCH MODES | |
|---|---|
| 1 | CLUTCH SWITCH OPENS WHEN ROD IS ATTACHED TO MAGNET |
| 2 | SEAT SWITCH CLOSED WHEN ROD IS IN SEAT |
| 3 | UPPER LIMIT SWITCH OPEN WHEN DRIVE IS AT UPPER LIMIT |
| 4 | LOWER LIMIT SWITCH OPEN WHEN DRIVE IS AT LOWER LIMIT |
| 5 | INTERMEDIATE LIMIT SWITCHES OPEN AT PRE-SET LIMIT. CLOSED OTHERWISE |

*Fig. 5A.*

| | |
|---|---|
| IC-1 | CLOSED CRM > 20 CPS |
| IC-2 | CLOSED ON LOG N CONFIDENCE |
| IC-3 | OPEN CRM < 1/2 SCALE (100 CPS) |
| IC-4 | CLOSED CRM > 8000 CPS |
| IC-5 | CLOSED CRM < 2 CPS |
| IC-6 | CLOSED CRM$\tau$ < 7 SEC |
| IC-7 | CLOSED LOG N$\tau$ > 25 SEC |
| IC-8 | CLOSED CRM$\tau$ > 25 SEC |
| IC-9 | CLOSED LOG N$\tau$ < 7 SEC |
| IC-10 | SERVO ERROR - INSERT |
| IC-11 | SERVO ERROR - WITHDRAW |
| IC-12 | CLOSED CRM CONFIDENCE |
| IC-13 | CLOSED CRM$\tau$ & LOG N$\tau$ = $\infty$(BOTH) |
| IC-14 | CLOSED ON LEVEL REVERSE |
| IC-15 | CLOSED ON SAFETY TROUBLE-REVERSE |
| IC-16 | OPEN ON MONITRON SCRAM |
| IC-17 | CLOSED ON LOG N LEVEL REVERSE |

*Fig. 5B.*

| | OFF | ON |
|---|---|---|
| 1 | | X |

KEY SWITCH
K-1
*Fig. 4A.*

| | OFF | RAISE |
|---|---|---|
| 1 | | X |

S-2
RAISE CLUTCH
*Fig. 4B.*

| | OFF | AUTO |
|---|---|---|
| 1 | | X |
| 2 | | X |
| 3 | | X |

S-5
F.C. AUTO
*Fig. 4C.*

| | OFF | RAISE |
|---|---|---|
| 1 | | X |

S-16, S-17, S-18
ROD RAISE IN RAISE CLUTCH MODE
*Fig. 4D.*

| | SCR. | NORM | SCR. |
|---|---|---|---|
| 1 | | X | |
| 2 | | X | |
| 3 | | X | |
| 4 | | X | |
| 5 | | X | |
| 6 | | X | |

S-4
*Fig. 4E.*

| | INS. | NORM | WDR |
|---|---|---|---|
| 1 | X | | |
| 2 | | | X |
| 3 | X | | |
| 4 | | | X |
| 5 | X | | |
| 6 | | | X |

S-14
GROUP ACTUATE
*Fig. 4F.*

| | 1 | 2 | 3 |
|---|---|---|---|
| 1 | X | | |
| 2 | X | | |
| 3 | | X | |
| 4 | | X | |
| 5 | | | X |
| 6 | | | X |

S-15
PREFERRED SELECTOR
*Fig. 4G.*

| | INS. | NORM | WDR |
|---|---|---|---|
| 1 | X | | |
| 2 | | | X |

S-3
REG. ROD ACTUATE
*Fig. 4H.*

| | INS. | NORM | WDR |
|---|---|---|---|
| 1 | X | | |
| 2 | | | X |

S-11, S-12, S-13
SHIM ROD ACTUATE
*Fig. 4I.*

INVENTOR.
Elbert P. Epler
BY Stephen H. Hanauer
Lester C. Oakes
ATTORNEY

INVENTORS
Elbert P. Epler
Stephen H. Hanauer
Lester C. Oakes
ATTORNEY

INVENTORS
Elbert P. Epler
Stephen H. Hanauer
Lester C. Oakes
BY
ATTORNEY

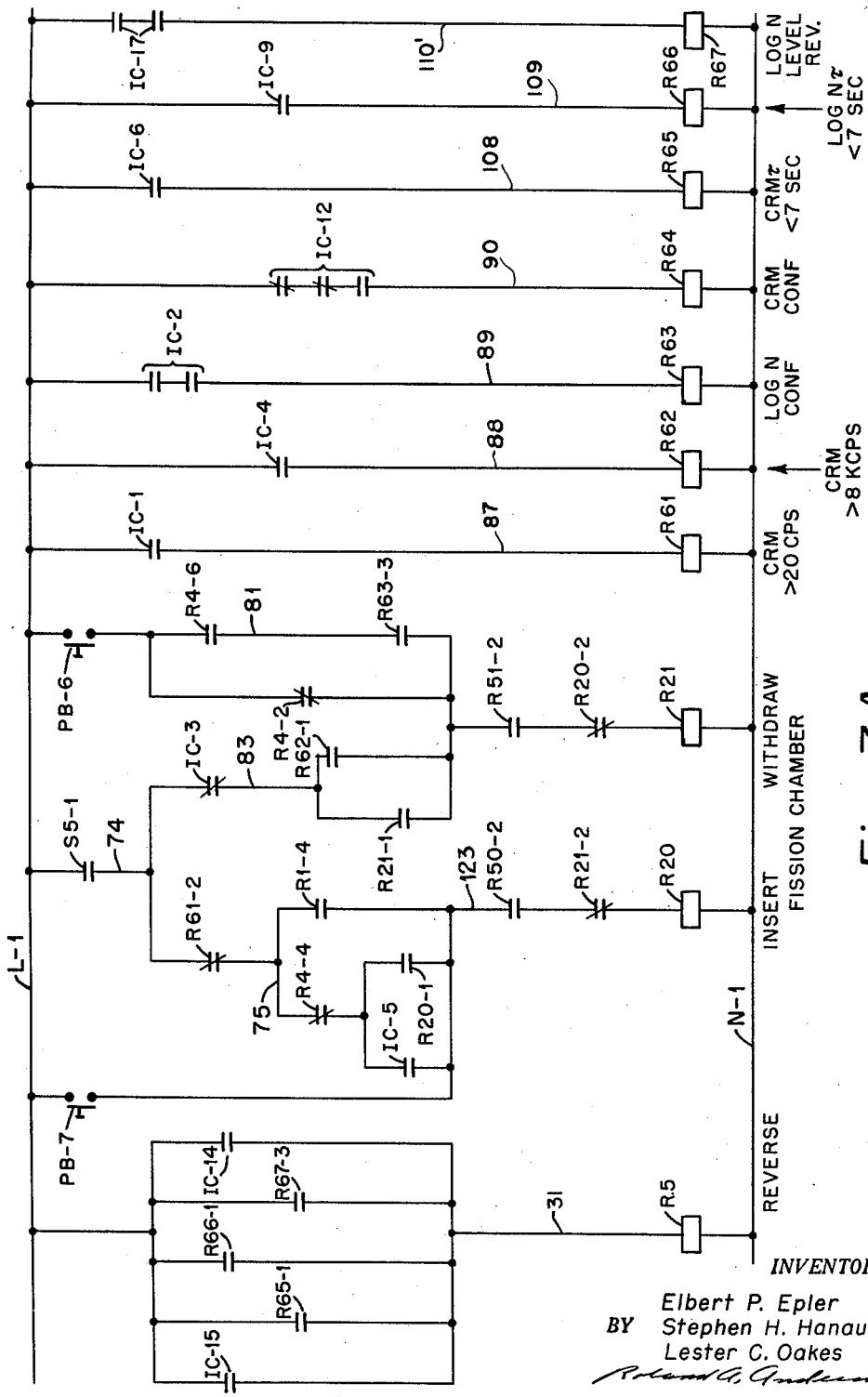

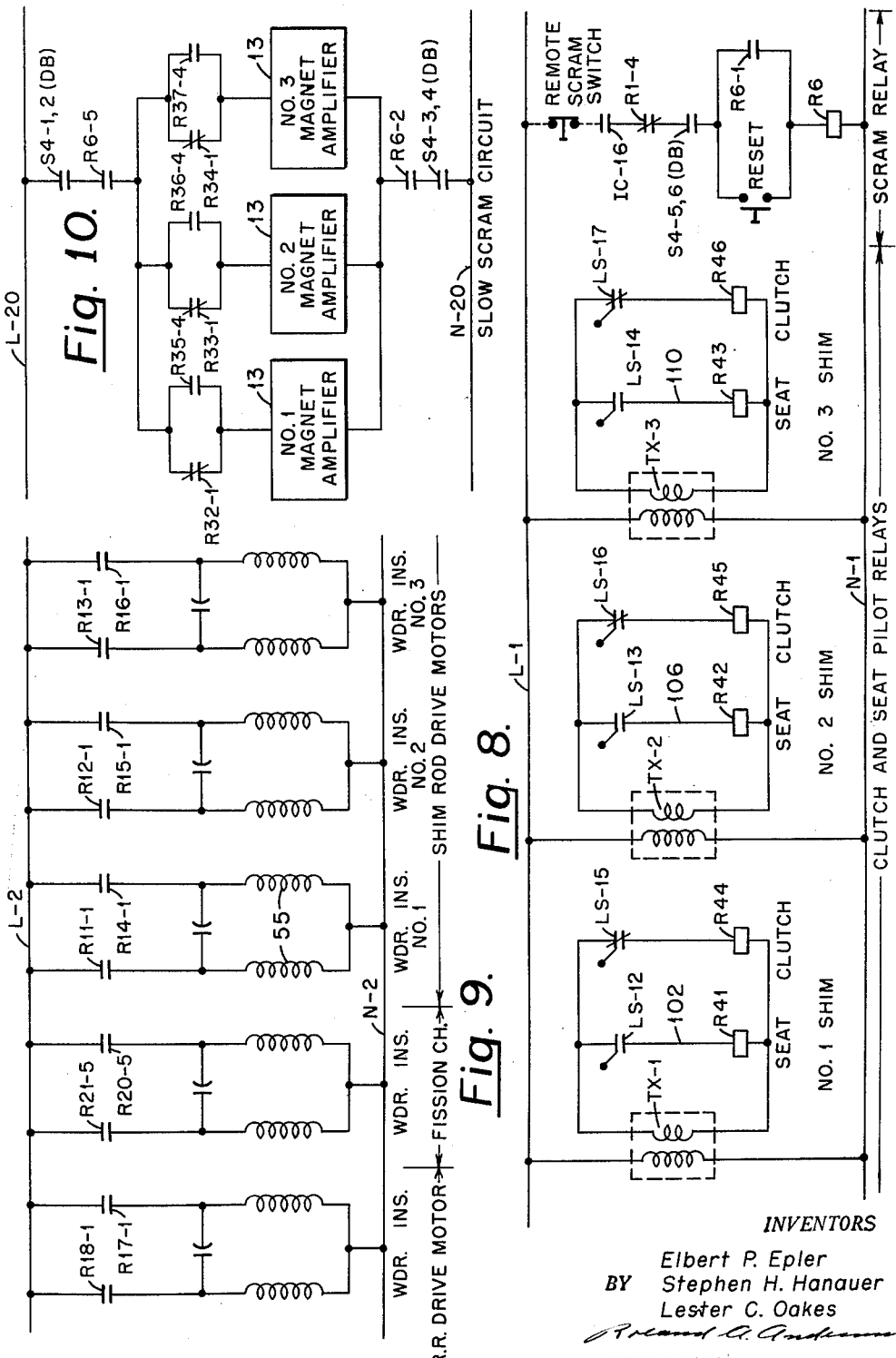

United States Patent Office 2,911,344
Patented Nov. 3, 1959

2,911,344

NUCLEAR REACTOR CONTROL SYSTEM

Elbert P. Epler, Oak Ridge, Stephen H. Hanauer, Kingston, and Lester C. Oakes, Knoxville, Tenn., assignors to the United States of America as represented by the United States Atomic Energy Commission Application August 15, 1956, Serial No. 604,290

10 Claims. (Cl. 204—193.2)

This invention relates to nuclear reactor control systems and more particularly to a reactor control system for automatically bringing a nuclear reactor to criticality, controlling its gradual rise in power to a selected value, and regulating or maintaining this desired power level.

In the prior art, it has been the practice to employ manual control for start-up and to rely on automatic control for maintaining a constant reactor power. However, the manual start-up requires the services of a highly skilled operator, and uncertainty of operation, may be introduced by human error. Moreover, the systems proposed for automatic start-up involved such complexity in construction and uncertainty in operation that it was not feasible to attempt to incorporate them in the reactor control arrangement. A further major disadvantage of the previously proposed systems was the absence of secondary and independent control for a safe and more reliable operation of the reactor. Despite the fact that the proposed systems might have more than one period circuit, the contemplated circuitry was such as to effectively utilize only a single period circuit, so that the safety and reliability of the reactor was dependent upon the reliability of the one instrument circuit.

Applicants with a knowledge of the problems of the prior art have for an object of their invention the provision of an automatic control system for a reactor which is simple in construction and arrangement, safe and reliable in operation and has demonstrative quality.

Applicants have as another object of their invention the provision of an automatic control system for a reactor which may be operated under the control of an unskilled operator.

Applicants have as another object of their invention the provision of a control system for a reactor which will provide both automatic start-up, and control of the reactor during constant-power operation.

Applicants have as a further object of their invention the provision of a control system for a reactor which may be utilized as either an automatic system or a manually operated system to control the start-up and the constant-power operation of the reactor.

Applicants have as a still further object of their invention the provision of a system to control the start-up of a reactor and bring it to any one of a number of selected power levels, and automatically maintain it at the desired level.

Applicants have as a primary object of their invention the provision of a system for relieving the operator of the necessity for making the routine operations which can be performed by the instruments, so that he can pay attention to events which can neither be sensed nor acted upon by the instruments.

Other objects and advantages of our invention will appear from the following specification and accompanying drawings and the novel features thereof will be particularly pointed out in the annexed claims.

Figure 6B:
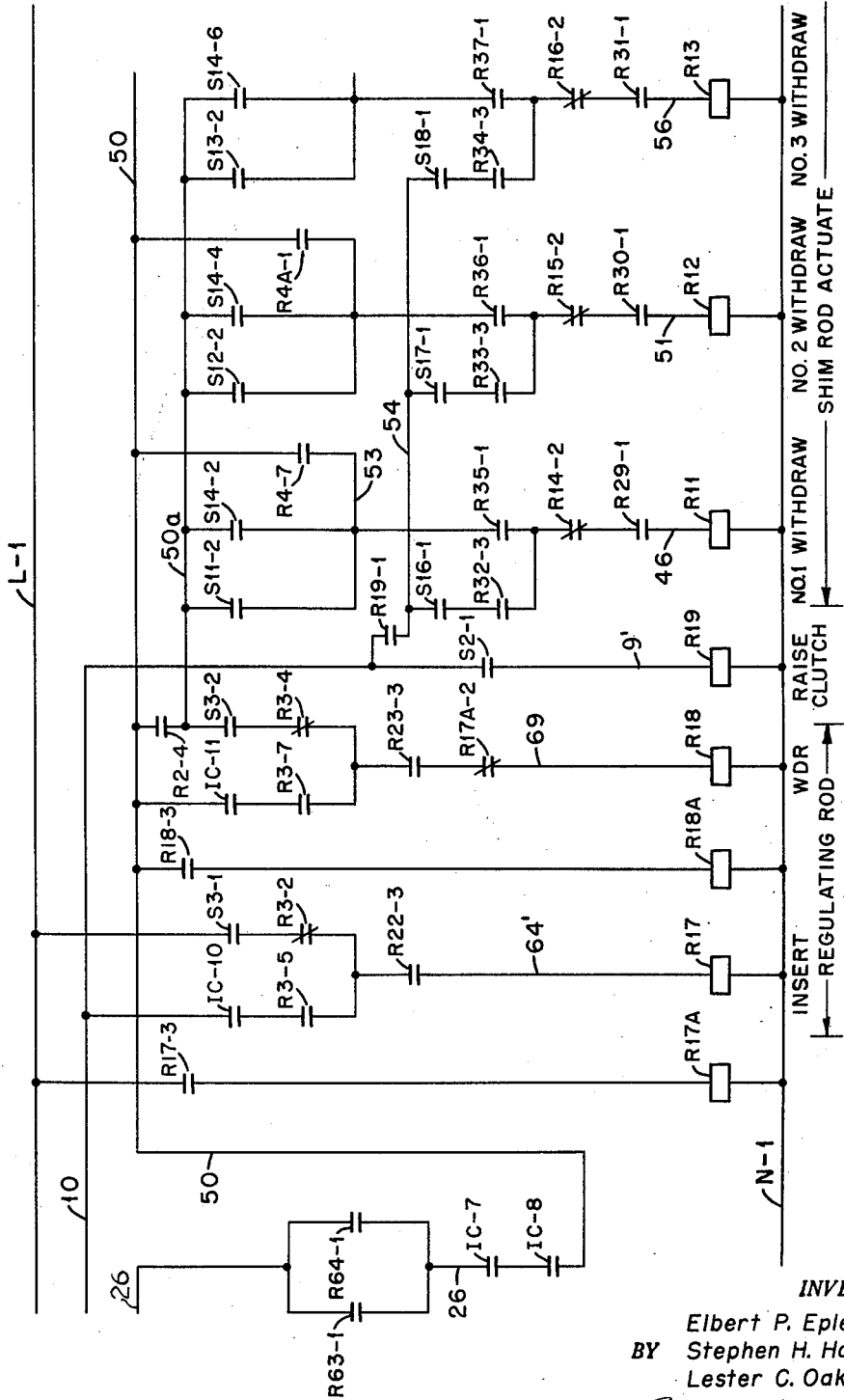
Figure 6C:
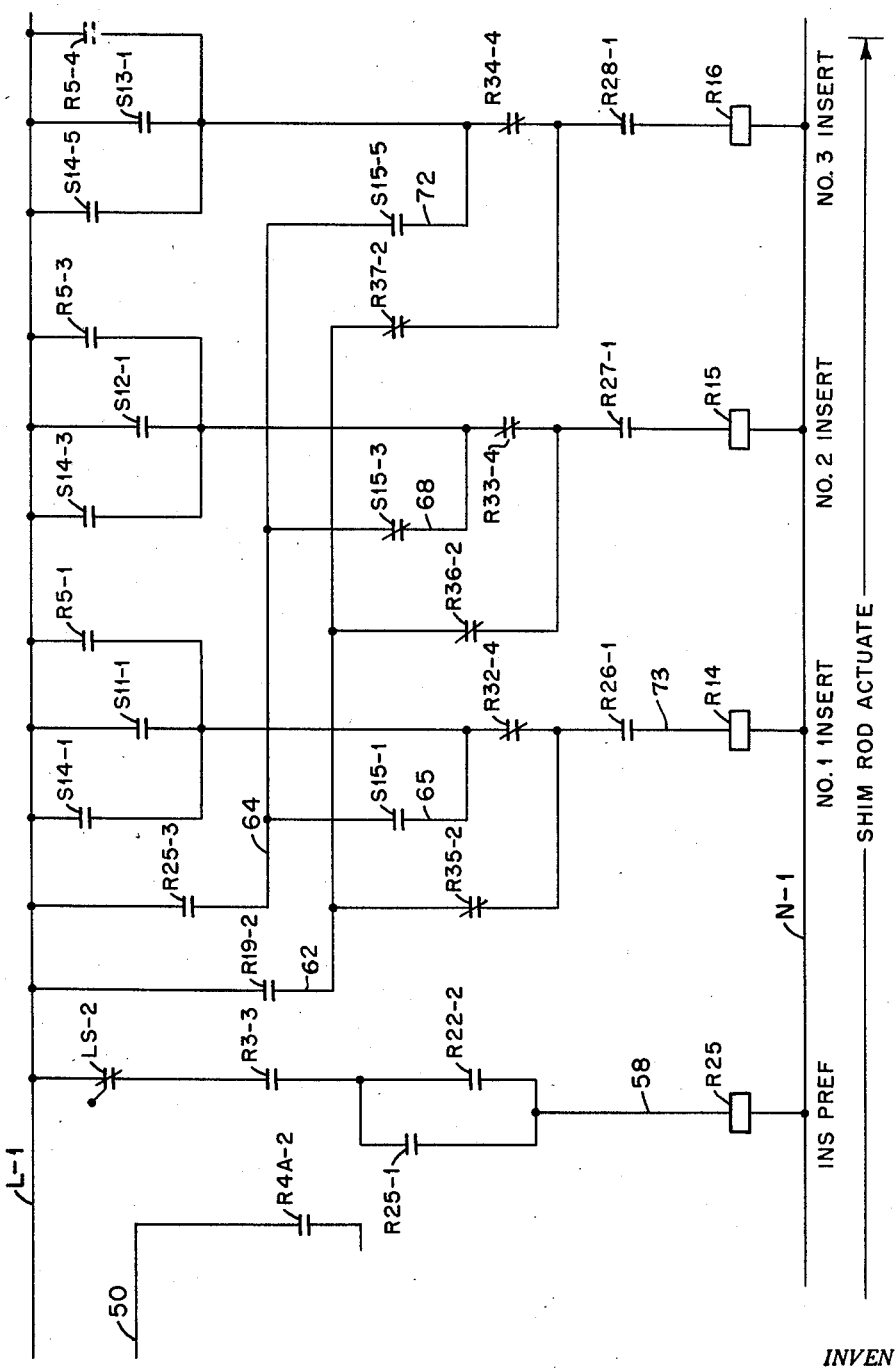
Figure 7B:
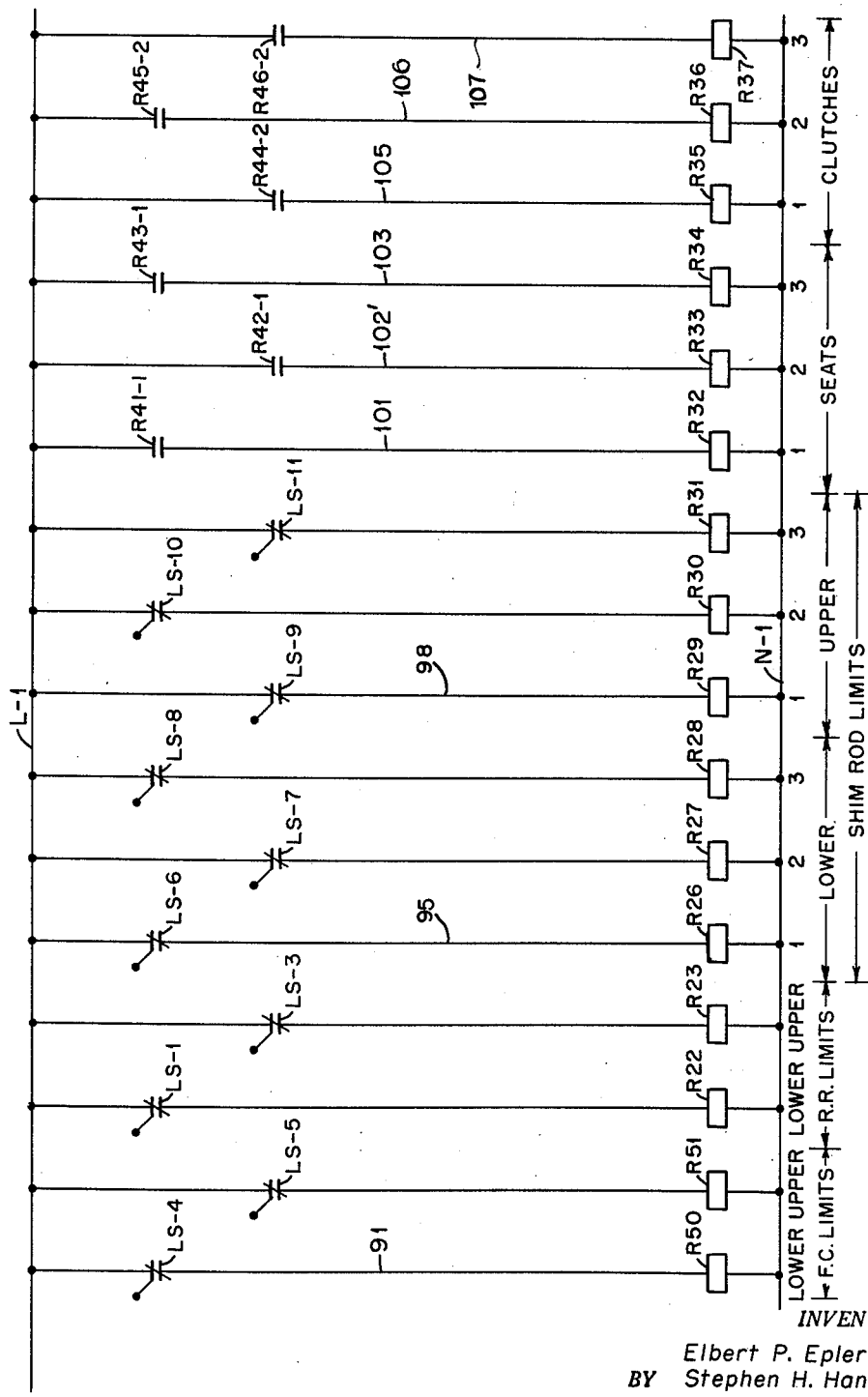

In the drawings, Fig. 1 is a block diagram safety system for inclusion in our improved control system. Fig. 2 is a block diagram of a suitable form of linear and servo channel for inclusion in our improved control system. Fig. 3 is a block diagram of a suitable form of count-rate meter channel for inclusion in our improved control system. Figs. 4A, 4B, etc., are legends useful in interpretation of the following figures. Figs. 5A and 5B are legends describing certain elements shown in the following figures. Figs. 6A, 6B, 6C are the control circuits for Instrument Start, end of start, run, servo, regulating rod, raise clutch, and shim rod control circuits. Figs. 7A, 7B are circuit diagrams for shim rod reverse, fission chamber position control, instrument control, limit seat and clutch control circuits. Fig. 8 is a circuit diagram of clutch and seat pilot switches. Fig. 9 is a circuit diagram of the regulating rod drive motor, fission chamber drive motor and shim rod drive motor circuits. Fig. 10 is a circuit diagram of the slow scram circuit.

The control system herein may be applied to any suitable reactor, such as that described in ORNL Report No. 963 (declassified) or those disclosed in a publication entitled "Research Reactors" published by U.S. Atomic Energy Commission or those shown in Fermi Patent No. 2,708,656 (May 17, 1955).

The specific embodiment described hereinafter and illustrated in the drawings is incorporated in the Oak Ridge Swimming Pool Reactor. It is preferable that the control rods move in a vertical plane above the active portion of the reactor, so that when the absorbers are released by their supporting clutches they may drop by gravity towards the active portion and shut down the reactor. However, it is not intended to limit the application of the control system of this type of reactor, or to absorber type control rods, as our novel system may be adapted for use with power or research reactors, homogeneous or heterogeneous, by suitable changes within the skill of the art. In considering the drawings it will be helpful to keep in mind that the block diagrams of Figs. 1-3, inclusive, are the instrument circuits of the system. They are fed by detectors responsive to conditions in the reactor and are intended to supply signals that reflect the operating conditions in such reactor. These signal channels are tied by relays into the various circuits that control the operation of the reactor. These control circuits are shown in Figs. 6A, 6B, 6C, 7A, 7B, and 8, and include the Instrument Start, End of Start, Run, and Servo control circuits, the various Insert and Withdrawal control circuits with their interlocks for the Shim and Regulating Rods, and the Fission Chamber, the Clutch and Seat relays, and the Scram relay. It will be observed that the control circuits of these figures are successively tied together in parallel through the power leads or lines L–1 and N–1. Figs. 9 and 10 are power circuits. The former includes the motor drives for moving the control rods and fission chamber, and the latter is the Slow Scram circuit for controlling the magnet amplifiers 13 which release the shim rods to produce a Slow Scram. They receive their power through leads L–2, N–2, and L–20, N–20, which are independent, but are controlled by the control circuits of Figs. 6A, etc. through interlocks.

*Switch legends*

The legends of Figs. 4A–4I and 5A and 5B are intended to serve as schematics of manually operated switches. The first unlabeled column indicates the contacts of the switch, and the other columns indicate the positions of the switch. The "X" marks under each column opposite the various contacts indicates which contacts are closed in each position of the switch. If the preferred selector switch, S–15, of Fig. 4G is taken as an example, it will be seen that when the switch is in the #1 position, contacts S15–1 and S15–2 are closed and the other four contacts of the switch are open. When the fission chamber auto switch S–5 of Fig. 4C is in the "auto" position all three contacts of the switch are closed. However, contacts S5–2 and S5–3 are spares and are not included in the control circuits of Figs. 6A, etc. and Figs. 7A, etc.

In considering the foregoing, it will be understood that legends are employed instead of the complete structural switch assemblies in the drawings in order to clearly indicate the action of the switches and the contacts that are closed in their different positions. However, the various contacts of these switches are physically shown in the particular circuits where they are located in Figs. 6A, 6B, 6C, 7A, 7B, 8, 9, and 10.

Safety system

Referring to the drawings in detail, a safety control system for releasing the shim rods from their magnetic clutches to drop by gravity into the active portion of the reactor, is shown in Fig. 1. This safety system is similar to the one disclosed and described in detail in the prior co-pending application of Newson et al., Ser. No. 357,216, filed May 25, 1953. It is comprised of three level channels generally designated 1, 1, 1, and one or more period channels 2.

In each channel 1 a signal proportional to neutron flux is obtained from a boron-coated "parallel circular plate" or other suitable ionization chamber 3. One suitable type of chamber is the type discussed in ORNL Report 1080, issued September 4, 1951, and entitled "The Neutron Sensitive PCP Ionization Chamber." Current through this chamber is fed into a D.C. type safety preamplifier 4 with a cathode-follower type output which feeds a signal into a sigma amplifier 5, whose output is connected through a cathode-follower coupling tube to a sigma bus 6. An appropriate safety trouble monitor 20' is coupled through lead 15 to the various sigma amplifiers 5 to detect any failure that might occur. The monitoring circuits of this arrangement are essentially the same as those disclosed in Newson et al., supra, and include, in addition, contacts IC14 in the reverse circuit 31 of Fig. 7A. In the operation of each level channel 1, ionization current passing through the chamber 3 is proportional to the neutron flux. The cathode follower stage of the preamplifier 4 then measures the voltage developed across a resistor through which the chamber current flows. The output signal from the preamplifier 4 is then applied to the sigma amplifier 5 which produces, at least at a point near full power, a signal at its output which is proportional to the input signal. The outputs of all sigma amplifiers comprise the potential of the sigma bus 6.

The period channel 2 is also similar to that disclosed in Newson et al., supra, and is founded on the proposition that a signal proportional to $$\frac{d}{dt}(\log N)$$

is a useful indicator of the excess K of the reactor. It is convenient to generate such a signal by first obtaining a voltage proportional to log N and then differentiating it by passing it through an appropriate circuit.

The signal proportional to log N is obtained from a compensated ionization chamber whose current is proportional to neutron flux. This current is passed through a thermionic diode operating in its logarithmic range, such that the voltage across the diode is made to be proportional to the logarithm of reactor power. However, fission product gamma rays produce current in the ordinary boron-coated ionization chamber, and this situation is not favorable after the reactor has been running at some high power for a while, and the neutron flux is then reduced. The gamma intensity will decrease slowly as compared to the neutron flux because of the presence of long-life gamma emitters among the fission products. To overcome these effects, a compensated ionization chamber 7 is employed. One suitable form of such a compensated ionization chamber is found in the patent to MacNeille, No. 2,714,677. This makes it possible to have valid readings of neutron flux, in the presence of a large gamma flux. The chamber 7 feeds into the log N amplifier 8 having contacts IC2 in the log N confidence circuit 89 of Fig. 7A which are closed in response to the closing of the "calibrate" switch and which provides a D.C. signal which is a logarithmic function of the neutron flux for the log N recorder 9, and a D.C. signal which is a derivative of the logarithmic function of the neutron flux for the period recorder 10 which operates contact IC7 in the control circuit 26 of Fig. 6B, contact IC9 in circuit 109 of Fig. 7A, and contact IC13 in the "Run" circuit 19' of Fig. 6A. However, the derivative network of this amplifier is not used to control the operation of the safety system. Instead, the logarithmic output of amplifier 8 is fed to a period amplifier 11 which serves as a coupling or matching amplifying device and as the derivative circuit between the log N amplifier 8 and the sigma amplifier 5'.

The high-voltage power supply 12 is conventional and is intended to meet the requirements of the compensated ionization chamber for positive and negative potentials for its high-voltage electrodes.

The log N recorder 9 has a relay whose contact IC2 is in the log N confidence circuit 89 of Fig. 7A, and has a series of contacts IC17 of a power selector multi-contact switch which are located in the log N level reverse circuit of Fig. 7A. It will be noted that each set of parallel contacts of that switch has been lumped into a single contact in circuit 110 of Fig. 7A for convenience in showing.

The three magnet amplifiers 13, 13, 13 are fed by the sigma bus 6 and in turn serve to energize the magnets 14, 14, 14 that support the three shim rods. Each magnet amplifier 13 contains a D.C. power amplifier for supplying current to the electro-magnet 14, in combination with a voltage amplifier to regulate this current. The voltage amplifier of the magnet amplifier 14 must function to deenergize the magnet 14 to drop the rod when the sigma bus potential departs in either direction from its quiescent potential. In operation, the current through the magnet 14 is decreased by the magnet amplifier 13 to release the shim rod when a certain predetermined flux is reached, or when an undesirably short period is obtained. Under the control of the sigma bus 6, as the power level is increased or the period becomes shorter, the current through the magnet 14 is decreased until the point is reached where the magnet is no longer able to support the rod. A monitoring circuit 15 is provided for the sigma amplifiers.

Linear channel

Referring now to Fig. 2, one compensated ionization chamber 16 of any suitable form, such as the one heretofore described, supplies current to the micro-micro-ammeter 17, which is a stable D.C. amplifier with many input current ranges. It is usable at currents as low as $10^{-10}$ amperes and as high as $10^{-4}$ amperes, the point at which the chamber begins to show saturation effects. The output signal from the micro-micro ammeter operates a flux recorder 18, is coupled to a series of parallel contacts IC17 on the power level selector switch in the log N level reverse circuit 110 of Fig. 7A, and also serves as the input signal for the servo amplifier 19 which drives the regulating rod and operates relays having contacts IC10 and IC11 in the regulating rod "insert" and "withdrawal" circuits 64 and 69 of Fig. 6B. The servo system may also take the form of the one disclosed in the application of Newson et al., supra, and in any form serves to maintain the reactor power constant by causing needed changes in reactivity through the movement of a control rod. A high-voltage supply for the chamber 16 is shown at 20.

Count rate channel

The count rate channel of Fig. 3 is similar to that disclosed in Newson et al., supra, and comprises a fission chamber 20 such as that described in chapter 9 of "Ionization Chambers and Counters," by Rossi and Staub, published by McGraw-Hill in 1949, which is adapted to be physically moved towards and away from the active portion of the reactor to keep the instrumentation in range by a motor 21 and a drive arrangement (not shown). Pulses from the fission chamber are fed into a linear preamplifier 23 coupled to a power supply 22. The output of the linear preamplifier is fed into a linear amplifier 24 which has its output signal coupled to scaler 25 and to a circuit including log count rate meter 26, log count rate meter recorder 27, period circuit 28 and period recorder 29. The linear amplifier 24 also controls a relay having contact IC12 in the count rate meter confidence circuit 90 of Fig. 7A and may take any suitable form such as that described in an article by Bell et al. in the October 1947 issue of "Review of Scientific Instruments," volume 18, page 703. The scaler 25 may be of the type described in "Review of Scientific Instruments," volume 18, page 706, or it may take any other suitable form. The log count rate meter 26 is an integrating device which gives a D.C. output potential that is a logarithmic function of the average counting rate. One suitable form of count rate meter is discussed in ORNL publication No. 413, "Logarithms in Instrumentation," by W. G. James, and schematically shown in the circuit diagram of Fig. 4, of that publication, and includes a capacitor and a logarithmic diode. The log CRM recorder 27 controls contacts IC12, IC12 in the CRM confidence circuit 90 of Fig. 7A. Contact IC3 of the fission chamber withdrawal circuit 83, and contact IC1 of circuit 87, and contact IC5 of the fission chamber insert circuit 75.

The count rate period circuitry operates on the same principle as the period circuitry in the period channel 2 of Fig. 1. A signal proportional to the logarithm of the average count rate is differentiated and the resulting D.C. voltage has the same characteristics as the D.C. voltage which is the period output of the log N amplifier 8 of Fig. 1. This period signal of log count rate meter 26 of Fig. 3 is applied to the log count rate meter period recorder 29. Recorder 29 serves to control contact IC8 in control circuit 26 of Fig. 6B, contact IC6 in the circuit 108 of Fig. 7A, and contacts IC13 in the "Run" circuit 19' of Fig. 6A.

For a further discussion of the instrumentation shown in block form in Figs. 1–3, see the reports by Banta and Hanauer, ORNL–CF 56–5–30, Sections A–H, available from the office of Technical Services, United States Department of Commerce, Washington, D.C.

*Shim rod control*

In addition to the drastic control action effected by the "scram" of the shim rods; i.e., their release by the magnets 14 to drop into the active portion of the reactor and "shut it down," there is control by motor-driven insertion and withdrawal of the rods which is exercised (a) manually through manipulation of the shim rod controls by the operator acting in response to the indicators or recorders or (b) automatically in response to the completion of certain circuits by switches, which respond to certain conditions in the instrumentation channels, or to certain positions of the shim rods and/or regulating rod, or to the action of the reverse circuit. Since one or more of the elements and/or signal channels can serve to interrupt the continuity of the shim rod or regulating rod motor control circuits, preventing withdrawal of the rods, and can, under certain conditions, affect a reverse and initiate an insertion of the rods, they are generally referred to as "interlocks." Thus the shim rods not only perform a safety function, but also serve to regulate the multiplication of the reactor and the level of the neutron flux, for each shim rod motor when operated in one direction moves the shim rod towards the active portion of the reactor, and when operated in the opposite direction moves it away from the active portion.

*Shim rod withdrawal*

Referring now to Figs. 6A, 6B, etc., 7A, 7B, etc., 8, 9, and 10 showing the one form of elementary circuit digram for the rod actuator and rod control circuitry, it will be understood that the control elements for this reactor comprise three shim rods and one regulating rod. We will first consider the control and operation of the #1 shim rod. It will be seen that relay R11 is the relay which withdraws the #1 shim rod by energizing its motor windings 55 through contact R11–1 of Fig. 9. This drives the motor in the withdrawal direction.

In order to energize relay R11 the following permissive interlocks in Fig. 6A must be closed. First, the master switch contact K1–1 must be closed, indicating that the key switch is in the "operate" position and that the operator has permission to run the reactor. Second, contact R5–2 must be closed indicating that no abnormal condition is calling for a reverse. Reverse is described below. Third, contact R63–1 or contact R64–1 of circuit 26 in Fig. 6B must be closed. These are contacts whose aspects depend on monitoring devices, called confidence circuits. Relay in the log N confidence circuit 89 of Fig. 7A R63 is a relay which monitors the log N circuit. One embodiment of the log N confidence circuit is a pair of contacts IC–2 in circuit 89; one of them in the log N recorder 9 of Fig. 1 is closed above $10^{-5}$ times full power, and the other in the log N amplifier 8 of Fig. 1 is closed when its calibration switch is in the "Operate" position. Closing both contacts IC–2 energizes relay R63 in circuit 89 of Fig. 7A, showing that the log N circuit is presumably in working order. Relay R64 is a relay in the count-rate confidence circuit 90. One embodiment of a count-rate confidence circuit is a contact on the counting-rate recorder 27 of Fig. 3 indicating that the counting rate is at least 2 counts per second, plus a contact on the counting-rate recorder 27 indicating that the counting rate is no greater that full scale, plus a contact on the counting-rate amplifier 24 of Fig. 3 indicating that it has not been turned to the "calibrate" position. If these contacts IC–12 be closed, relay R64 in the CRM confidence circuit 90 of Fig. 7A will be energized, showing that the counting-rate circuit is presumably in working order. The next interlock in circuit 26 of Fig. 6B is in the form of contacts IC–7 and IC–8. These are contacts in the period recorders 10, 29 of Figs. 1 and 3, respectively, and heretofore referred to in the discussion of those figures. Contact IC7 is closed when the log N period is greater than 25 seconds. Contact IC8 is closed when the counting-rate meter period is greater than 25 seconds. The occurrence of a period shorter than 25 seconds as shown on either period meter will inhibit rod withdrawal. If all of the above permissive interlocks are closed, lead 50 is energized permitting withdrawal of the rods in the instrument start mode. This is accomplished when R4 and R4A are energized as described later.

To withdraw rods in the manual mode or "run," contact relay R–2 is energized and R2–4 must be closed, energizing wire 50A. Relay R2 is the "run" relay and will be discussed later. Having energized leads 50 and 50A the operator, as indicated in the legends of Figs. 4F and 4I, may now manually withdraw the rods by operating either the individual withdrawal switch S–11 for rod number one, switch S–12 for rod number two and switch S–13 for rod number three or the group withdrawal switch S–14, for all of the rods. Considering rod number one as typical, the closing of S–11–2 contact on the individual withdrawal switch or contact S–14–2 on the group withdrawal switch, energizes lead 53. If now the contact R35–1 on the clutch switch relay R–35 is closed, and this will be true of the number one rod and its magnet are in contact so that clutch switch LS–15 of Fig. 8 is open, relay R44 is deenergized and contact R44–2 in circuit 105 of Fig. 7B is closed, and if contact R14–2 is closed indicating that relay R–14, the number one insert relay in circuit 73 of Fig. 6C, is not energized, and if contact R29–1 of circuit 46 of Fig 6B is closed indicating that the rod is not in its upper limit, relay R11 may then be energized to withdraw number one shim rod. Any attempt to insert the rod will energize relay R14, and this insert action has priority over any withdrawal. Contact R14–2 enforces this priority.

To operate the shim rod motors by energizing lead number 54 is known as "raise clutch" mode. It is intended for testing the rod actuator mechanisms without actually withdrawing the rods. The operator actuates switch S2 to the "raise" position, as indicated in the legend of Fig. 4B closing contact S2–1 in circuit 9' of Fig. 6B and energizing relay R19. This closes contact R19–1 which energizes lead 54 initiating the "raise clutch" mode. At the same time contact R19–4 is opened deenergizing relay R–6 in the scram relay circuit of Fig. 8. This opens contacts R6–2 and R6–3 in the slow scram circuit of Fig. 10, deenergizing the magnet amplifiers 13 and insuring that the rods are not picked up. Having energized lead #54 in Fig. 6B the operator may now actuate switches S16, S17, S18 to the "raise" position and indicated in the legend of Fig. 4D, thereby closing contacts S16–1, S17–1, and S18–1, respectively which raise the number one, number two, and number three shim rods under the supervision of the seat switches, which supervision is exercised by contacts R32–3, R33–3, and R34–3. The sequence is therefore as follows: The operator actuates switch S–2 selecting the "raise clutch" mode. This energizes relay R19 in circuit 9' of Fig. 6B through contact S2–1, and "scrams" the reactor. The operator may then raise the rods as the seat switches S32–3, S33–3 and S34–3 are closed and insure that the rods themselves stay seated and that only the magnets and the mechanisms are moved.

Shim rod insertion

The insertion of shim rods being an inherently safe action is controlled by a group of parallel interlocks rather than a series circuit as in the withdrawal interlocks. The arrangement of Fig. 6C includes these circuits. Insertion of the shim rods is accomplished by energizing relays R14, R15, and R16 in Fig. 6C which close contacts R14–1, R15–1, and R16–1 in the shim rod motor circuits of Fig. 9, to operate the shim rod motors. These relays are supervised by the shim rod lower limit switch relay contacts R26–1, R27–1 and R28–1. Manual insertion of the shim rods is accomplished through manually operated switch S14, the group insert as indicated in the legend of Fig. 4F, or reverse switch, or manually operated switches S11, S12, and S13, the individual rod switches, as indicated in the legend of Fig. 4I. Relay R5, the reverse relay, in circuit 31 of Fig. 7A also inserts the rods by closing contacts R5–1, R5–3 and R5–4. The insertion proceeds until the cause is removed or until the rod is seated as shown by the opening of contacts R32–4, R33–4 and R34–4 actuated by the seat switch relays in circuits 101, 102', and 103 of Fig. 7B. These relays are, in turn, controlled by the seat contacts LS–12, LS–13, and LS–14 of Fig. 8 which complete the circuits for relays R41, R42, and R43, which have contacts R41–1, R42–1, and R43–1, in circuits 101, 102', and 103 in Fig. 7B.

Automatic insertion of the shim rod drive mechanism

If one of the rods should become disengaged from its magnet, its clutch switch will close contact LS–15, LS–16 or LS–17 in Fig. 8 energizing relay R44, R45, or R46, opening contact R44–2, R45–2, or R46–2 in circuits 105, 106, and 107 of Fig. 7B, and deenergizing relay R35, R36, or R37, closing contact R35–2, R36–2 or R37–2 in Fig. 6C. Since the driving mechanism is not fully lowered, the appropriate lower limit switch is not actuated and contact LS–6, LS–7 or LS–8 of Fig. 7B is closed, energizing relay R26, R27 or R28, and closing contact R26–1, R27–1 or R28–1 in Fig. 6C. This will cause insertion of the appropriate drive mechanism until the magnet and the rod are reengaged or until the drive mechanism reaches its lower limit. This automatic insertion of the drive mechanism has been provided to assure that the magnets will always be in contact with the rods. This assists in keeping the mating surfaces clean. The automatic follow up is inhibited by relay R19, the raise clutch relay, since it would interfere with the raise clutch withdrawal mode. This is accomplished through the contact R19–2 in circuit 62.

Shim rod insertion through action of reverse circuit

The operation of relay R5, the reverse relay, of Fig. 7A, is similar to the same function of the corresponding circuit in the system of the prior co-pending application of Newson et al., supra. Conditions requiring a reverse are made to energize relay R5. Contacts R5–1, R5–3 and R5–4 of Fig. 6C close when R5 is energized, and energize relays R14, R15, and R16 driving the motors in the direction to insert rods as described above. Reverses are obtained from the following sources: (a) the simultaneous occurrence of two or more troubles in the safety circuit will close contact IC–15 in Fig. 7A and will produce a reverse, (b) the occurrence of a period shorter than 7 seconds will produce a reverse. If the log N period recorder 10 shows a short period, contact IC–9 of circuit 109 in that recorder will be closed, energizing R–66 of circuit 109 of Fig. 7A, closing R–66–1, which energizes relay R5. If the count-rate period recorder 29 of Fig. 3 shows a short period, contact of circuit 108 in that recorder will be closed, energizing R–65 of circuit 108 of Fig. 7A, closing contact R–65–1, which energizes R5 of circuit 31 of Fig. 7A, (c) the actuation of the supervisory contact IC–17 in the log N recorder 9 of Fig. 1 appropriate to the selected servo range will produce a reverse by closing contact IC–17, energizing relay R–67 in circuit 110, closing R–67–3 circuit 31, both of Fig. 7A, and energizing relay R5, since the servo has obviously lost control (this is fully discussed below under "servo"), and finally, (d) a reverse is called for if the level as seen by any of the safety circuits exceeds a certain preset level somewhat below the scram level but above full power. This is accomplished by closing IC–14, a contact in the safety trouble monitor 20' of Fig. 1, which energizes relay R5. This interlock has been added to make less likely a "scram" caused by a slow power rise.

Regulating rod motion and servo

The control of the regulating rod may be either manually or at the direction of a servo system. The output of the servo amplifier is manifested as the aspects of two contacts IC10 and IC11 in leads 64' and 69 of Fig. 6B. Contacts IC10 and IC11 are shown in Fig. 2 in the servo amplifier 19. They are actuated by relays in the amplifier, when it detects an error requiring rod motion. Contact IC10 is closed when the servo error is such that the rod is to be inserted. Contact IC11 is closed when the servo error is such that the rod is to be withdrawn. If the servo error is zero or close to zero neither contact IC10 nor IC11 is closed. The selection of the mode for operating the regulating rod is shown in the aspect of relay R3 of Fig. 6A. If the servo is to be turned on the operator actuates the "servo on" pushbutton 34 in circuit 25' of Fig. 6A which energizes relay R3, and relay R3 remains energized until the "servo off" pushbutton 34' is actuated at which time relay R3 is deenergized. When relay R3 is energized contacts R3–1, R3–5 and R3–7 are closed. Contact R3–1 completes a holding circuit, while contacts R3–5 and R3–7 in circuit 64' and 69' of Fig. 6B, connect the servo amplifier contacts, IC10 and IC11, through contacts R22–3, R23–3, of relay R–23 and contact R17A–2 with relays R17 and R18 which are, respectively, the "insert" and "withdraw" relays. Relay R23 in Fig. 7B is energized by the normally closed contacts LS–3 of the upper limit switch of the regulating rod. When relay R17 or R18 is energized contacts R17–1 or R18–1 energize the regulating-rod motor windings in Fig. 9. When relay R3 is deenergized, contacts R3–2 and R3–4 are closed and contacts R3–5 and R3–7 are opened, thereby connecting the regulating-rod "insert" and "withdrawal" relays R17 and R18 of Fig. 6B to contacts S3–1 and S3–2 of the regulating rod switch, which is actuated manually by the operator as indicated in the legend of Fig. 4H. The operation of the regulating rod is also supervised by the regulating rod limit switches through contacts R22–3 and R23–3; and R17A–2 which serve as interlocks preventing withdrawal of the rod if it is already being inserted. When considering the instrument start contacts and interlocks one has to remember first that the servo is turned on and the operator has selected some range at which the servo will operate. The selection of the servo range is accomplished by the operator through the manipulation of a multi position switch in the micromicroammeter 17 of Fig. 2, each position of which selects a single range. He does this before starting, and he may select a new range at any time during "start" or "run." The selection of the servo range is also made to select one of a number of contacts in the log N recorder 9. This selection is made by means of an additional selector switch section mechanically coupled to the range selector switch on the micromicroammeter, 17. This switch determines which of the log N recorder contacts will supervise the operation of the system. The selected contact on the log N recorder 9 is always set somewhat above the selected servo range but sufficiently close to supervise operation. If the reactor power goes above the selected servo range and the contact in the log N recorder is actuated, this is an indication that the servo is not operating in an orderly manner and requires corrective action, as described above under "reverse." The operation of the servo depends on closing contacts R35–3, R36–3, R37–3, on the clutch switch relays previously described. This places power on lead 11' for circuit 25' of Fig. 6A. R35–3, R36–3, and R37–3, are closed when the rods are connected to the magnets, since this energizes relays R44, R45, and R46 of Fig. 8 and completes circuits 105, 106, and 107 to energize relays R35, R36, and R37. The purpose of this interlock is to inhibit servo withdrawal of the regulating rod if a shim rod is dropped by the scram circuits.

*Preferred shim rod insertion*

A preferred shim rod may be inserted if the regulating rod reaches its lower limit switch, showing that the servo has reached the limit of its control. When the regulating rod reaches its lower limit, limit switch contact LS–1 of Fig. 7B is opened, deenergizing relay R22 and closing contact R22–2 in circuit 58 of Fig. 6C. Then if the servo is turned on by closing switch 34 in circuit 25' of Fig. 6A, relay R3 is energized and contact R3–3 is closed in circuit 58, energizing relay R25 and closing contact R25–3 in circuit 64. Contacts S15–1, S15–3 and S15–5 of the preferred selector switch S15 are found in circuits 65, 68 and 72. One of these contacts will be closed depending on which rod has been selected by the operator as the preferred rod as indicated in the legend of Fig. 4G. If shim rod number one is selected, for example, contact S15–1 is closed, and relay R14 will be energized, inserting number one shim rod as previously described. The reactor power will tend to decrease; the regulating rod will be withdrawn by the servo, as it continues to maintain the reactor power constant. The intermediate regulating-rod limit switch LS2 in circuit 58 will open when the regulating rod reaches the center of its travel. This will open the circuit to relay R25 causing it to become deenergized. Contact R25–3 is opened in circuit 64, relay R14 is deenergized, and the motor ceases to insert the number 1 shim rod.

*Fission chamber motion*

The movement of the fission chamber may be in two modes as indicated in the legend of Fig. 4C; that is, "manual" or "automatic" as selected by the position of switch S5, the fission chamber manual-automatic switch. If the fission chamber is in its manual mode it may be inserted and withdrawn by actuating pushbuttons PB–7 and PB–6 respectively, of Fig. 7A subject only to the limit switches and to the interlocks that prevent the insert and withdraw relays, R–20 and R21, from being simultaneously energized. Fission chamber withdrawal, even in the fission-chamber manual mode is also supervised by the instrument start relay R4 of circuit 16' of Fig. 6A, and the log N confidence relay, R63 in circuit 89 of Fig. 7A, so that during an instrument start the fission chamber may be withdrawn only if the log N confidence relay is energized. If this is so, contact R–63–3 is closed, completing circuit 81, permitting withdrawal. This prevents withdrawing a fission chamber while it is the only instrument in operation. If the fission chamber automatic switch S5 is set to the "automatic" position, the manual pushbuttons PB–6 and PB–7 will still control the position of the fission chamber, if desired. In addition, the fission chamber will be controlled to provide that it will be in a suitable place without attention from the operator. The operation of the automatic fission chamber positioning is as follows: If, due to rising reactor power, the count-rate meter approaches full scale, contact IC4 on the count rate recorder 27 is closed completing circuit 88 of Fig. 7A, relay R62 is energized, and contact R62–1 is closed, energizing relay R21 and withdrawing the fission chamber. When the count rate has been decreased by withdrawing the fission chamber to a point such that the count rate is below half scale on the count rate recorder, contact IC3 in the count rate recorder 27 is opened, breaking circuit 83 of Fig. 7A, deenergizing R21, and stopping the fission chamber withdrawal. The automatic withdrawal of the fission chamber may also be stopped, in a variation of this design, by an intermediate limit switch or several such switches in sequence on the fission chamber drive, preset for appropriate counting rates. This is useful for evaluating counting rates in terms of reactor power, since a calibration may be made at these known fission-chamber positions. When the counting rate falls below two counts per second, either because the fission chamber is inadvertently withdrawn too far, or after a long shut-down when the reactor is first started up, contact IC5 of count rate meter recorder 27 in circuit 75 of Fig. 7A is closed, energizing relay R20 and inserting the fission chamber. The insertion continues until contact IC1 on the count rate recorder 27 closes at a counting rate of 20 c.p.s. energizing relay R61 in circuit 87 of Fig. 7A, opening contact R61–2 and deenergizing R20. Automatic fission-chamber insertion is also initiated by contact R1–4 in the instrument start regime as described below. In this connection, we have already postulated that switch S5 is the "automatic" position. If the chamber is at the limit of its travel, it will of course not move further in that direction.

*Instrument start—preliminaries*

Having turned on the master key switch K1, Fig. 6A the operator who wishes to start automatically, pushes the instrument start pushbutton 14A. This energizes relay R7, if power is available at lead 11' through contacts R5–2, R35–3, R36–3, and R37–3. Since the system is presumably not calling for a reverse, relay R5 is deenergized and contact R5–2 is closed. Likewise, the magnets are presumed to be in contact with the shim rods, closing contacts R35–3, R36–3 and R37–3, placing power on lead 11′. The energizing of relay R7 closes contact R7–1 and energizes relay R1 in circuit 13A through contact R4A–3, which is closed because relay R4A has not yet been energized. Relay R1 seals in through contact R1–1 which completes the circuit around contact R7–1, and relay R1 remains energized until relay R4A becomes energized, as will be described later. If switch S5, the fission chamber manual-automatic switch, is turned to the "automatic" position, as indicated in the legend of Fig. 4C, contact S5–1 in circuit 74 of Fig. 7A is closed. The energizing of relay R1 closes contact R1–4 in the fission-chamber insert circuit 123, which energizes relay R20, and initiates automatic fission-chamber insertion, until the counting rate exceeds 20 counts per second or the fission chamber reaches the lower limit of its travel. The energizing of relay R1 also closes contact R1–2 which initiates a request in circuit 16A of Fig. 6A to energize relay R4 subject to the following permissive interlocks: (a) the log N confidence contact R63–2 is closed or the count-rate confidence contact R64–2 plus a contact R61–1 are closed. The requirements for count-rate confidence for instrument start are more stringent than for manual rod withdrawal. This is shown by the addition of contact R61–1 which is closed when R61 in circuit 87 of Fig. 7A is energized by the closing of contact IC1 in the counting rate recorder 27 of Fig. 3 at counting rates greater than 20 counts per second. This number has been established experimentally as being the minimum counting rate with present equipment at which one can start on a 25 second period with the rod withdrawal rates now in use. Starting at lower counting rates would mean that the statistical fluctuation smoothing condenser in the counting-rate meter would impose too long an integration time on the counting-rate information, and contact IC8 of log CRN period recorder 29 in circuit 26 of Fig. 6B which inhibits rod withdrawal if the counting-rate period is shorter than 25 seconds, would be too sluggish in its operation for an orderly start-up. (b) Contact R3A–1 in circuit 16′ of Fig. 6A is also closed indicating that the servo has been turned on. This was accomplished by contact R1–3 in circuit 25′, which closed when R1 was first energized by the instrument chart pushbutton. (c) R40–2 is closed, indicating that the end-of-start relay R40 is not energized, as is discussed hereinafter. When these conditions are fulfilled relay R4 will become energized, closing contact R4–5, energizing relay R4A, and opening contact R4A–3 in circuit 13A, deenergizing relay R1. The inclusion of relay R4A in circuit 16′ is necessary to preserve a timing sequence by keeping relay R1 in circuit 13a energized sufficiently long to energize relay R4 and to permit contact R4–1 in circuit 16b to close.

*Instrument start—typical operation*

We now describe a typical start-up: With his key, the operator turns on the master key switch K1, Fig. 6A, placing power on lead 10′ and the "reactor on" lights L1 are lit. He next selects the servo range by manipulating the multi position switch on the micromicroammeter 17 of Fig. 2 to the desired position. Each position of the switch selects one range by closing the corresponding contact IC17. Having selected the servo range, he adjusts the servo demand to the reactor power at which he expects to operate. The selection of the servo range also selects one of the log N supervisory contacts IC17, as previously discussed. He may choose to insert the fission chamber manually to check its performance or he may simply push the instrument start pushbutton 14a in Fig. 6A, initiating the fission chamber insert sequence as previously described. The counting rate will then be about 20 counts per second, or a little above, depending upon the "coast" of the system. In any case, the servo will be turned on by contact R1–3 and the regulating rod will be withdrawn by the servo amplifier 34 to its upper limit, since the servo demand will be at some operating power and the present power is of course the shut-down power determined by the source and the shut-down multiplication. Since the system has succeeded in attaining an adequate counting rate, and turning on the servo, and assuming that the count-rate confidence is satisfied, relays R4 and R4A will be energized and the shim rods will begin to withdraw continuously and simultaneously. After some minutes of rod withdrawal the reactor will approach critical and the transient period will approach 25 seconds. At this time, one or both of the period meters will see these transient periods of 25 seconds, opening contact IC7 or IC8, inhibiting rod withdrawal for short intervals, since stopping the rods will have the effect of lengthening the period again, as the period is not yet stable. After a number of such intermittent withdrawals, the period will approach a stable value of 25 seconds and rod withdrawals will be only occassional as needed to offset any rise in temperature and consequent decrease in K, or other minor effects. The reactor will thus rise on the 25-second period with the three shim rods approximately equally withdrawn and the regulating rod fully withdrawn. As the power approaches the preset servo demand power, derivative networks in the servo amplifier will begin to insert the regulating rod, closing limit switch contact LS3, energizing relay R23 in Fig. 7B, closing contact R23–1, energizing relay R40 in Fig. 6A, opening contact R40–2, and deenergizing relay R4, ending "instrument" start. This is more fully described below.

After the reactor power has been levelled and it is running at a constant power determined by the setting of the servo demand, relay R2 will be energized, and the reactor will be in the "run" mode and will operate as long as desired. To change reactor power the operator need only change the servo demand to the new value. This is accomplished, as heretofore, by manipulation of the multi-position switch, selecting the particular position which corresponds to the desired range. If the new power is higher than the old, the regulating rod will withdraw, always under the supervision of the period contacts IC7 and IC8, of Fig. 6B so as to increase the power on a 25-second period until the new power is reached, at which time the regulating rod will be inserted by the servo amplifier 19 of Fig. 2 to level off the reactor at the new power. The supervisory contacts in the log N recorder 9 of Fig. 1 will be reselected with each change in servo range. If the new power is lower than the existing power the operator will need to decrease the servo demand in small steps of one or two ranges at a time, in order to avoid causing a reverse from the log N supervisory contact, which would occur if he should quickly decrease the requested power by several orders of magnitude. If he were to do this all at once he would be specifying a log N supervisory contact several orders of magnitude below his present power. The regulating rod would insert in order to reduce the power, but the power would not reduce fast enough to avoid actuating the log N supervisory contact. A reverse would ensue, and afterwards the operator would be required to withdraw shim rods, either manually or with a new instrument start, in order to regain criticality. To avoid this he should decrease power demand one or two ranges at a time. It is important to know that all changes in power, and in particular, all increases whether caused by the servo, or by manual operation, are supervised by the period contacts IC7 and IC8 of Fig. 6B. The period circuits are never turned on or off. All supervisory interlocks work at all times except that specifically associated with the instrument "start," namely the 20 counts per second contact R61–1 of Fig. 6A.

End of "start" and "run"

Since the loaded excess reactivity of a research reactor, or any reactor, is necessarily unknown, it is essential to provide some way of informing the control system when the start-up is over and the reactor has been brought to power and is now critical. Otherwise relay R4 would continue to withdraw the shim rods by means of contacts R4–7, R4A–1 and R4A–2, as long as the period remained longer than 25 seconds, and indeed the reactor would rise on a period of 25 seconds in spite of the servo until it were reversed or scrammed. For this reason relay R40 in the end-of-start circuit 10A is provided. When the regulating rod comes out of its upper limit, closing limit switch contact LS3, in Fig. 7B, this energizes relay R23 and closes contact R23–1 in circuit 10A of Fig. 6A, energizing relay R40, opening contact R40–2, deenergizing R4 and ending the start.

If, however, for any reason, the regulating rod fails to insert at the proper reactor power, the power will continue to rise until the selected log N supervisory contact is energized, closing IC17 in circuit 110′ of Fig. 7A, energizing R67, and initiating a reverse. Contact R67–1 in circuit 10a of Fig. 6A will also be closed, energizing R40, and ending the start. When the "start" is finished, relay R40 is energized, closing contact R40–1 in the "run" circuit 19′ of Fig. 6A. The shim rods are withdrawn from their seats, limit switches LS12, LS13 and LS14 in Fig. 8 are open, and relays R41, R42, and R43 in circuits 101, 106 and 110 are deenergized, contacts R41–1, R42–1, and R43–1 in circuits 101, 102′, and 103 of Fig. 7B are open, deenergizing relays R32, R33, and R34 and closing contacts R32–2, R33–2, R34–2 in circuit 19′ of Fig. 6A. Then if both period meters 10, 29 of Fig. 1 and Fig. 3, respectively, indicate that the period is approximately infinite, their contacts IC13, IC13 will be closed. In other words, if the pile is neither rising nor falling, then relay R2 in circuit 19′ of Fig. 6A may be energized which places the reactor in the "run" mode. Notice that starting manually by pushing the manual start pushbutton 43 places the reactor immediately in the "run" mode where it remains all during a manual start up. Energizing relay R2 completes a holding circuit by closing contacts R2–1, and now permits manual operation of the shim rods by closing contacts R2–4, placing power on lead 50a in Fig. 6B. When the operator is ready to shut down it is good practice to do so by using one of the safety devices of the reactor, such as a "scram" or a "reverse" in order to test them in the sequence to assure that they are still working.

It will be recognized by those versed in the art that the disclosed system, described above by way of illustration in connection with the Oak Ridge Bulk Shielding Facility Reactor (Swimming Pool), may be applied to control of other reactor types without departing from the teachings of our invention. Accordingly, it is intended that the scope of the invention be limited only by the attached claims, and not by the details necessarily attendant in applying a control method and apparatus to a particular facility.

Having described our invention what is claimed as novel is:

1. A system for automatic start-up and control of the power of a nuclear reactor wherein the power is controlled by changing the position of at least one of a plurality of control members and each member is moved by a reversible drive motor, comprising: First and second compensated ion chambers and a fission chamber disposed in said reactor to measure neutron flux, first circuit means for deriving a first signal proportional to the counting rate of said fission chamber, circuit means for deriving respective period signals proportional to the time derivative of the logarithm of said flux connected to said fission chamber and to said first ion chamber, and amplifying means connected to said second ion chamber; reversible drive means to insert and withdraw said fission chamber to regions of greater and lesser flux in said reactor, means to energize said drive means to insert said fission chamber, means to deenergize said drive means responsive to a selected level of said first signal and means to energize said drive means to withdraw said chamber responsive to a selected level of said first signal; a power source, switch means responsive to said period signals of less than a selected magnitude to couple said source to said reversible drive motors to withdraw said rods and to decouple said source at said selected magnitude, circuit means having a first input corresponding to selected reactor power, a second input coupled to said amplifying means, and an output, and means actuable by said output to couple said power source to said motors to energize the same in a direction responsive to the polarity of said output.

2. A reactor control system for a reactor wherein the power is controlled by changing the position of at least one control member and each member is moved by a drive motor, and the power is measured by neutron-responsive detectors, comprising: A source of power, a first circuit for deriving from one of said detectors a first signal proportional to reactor power, a second circuit for deriving from a second of said detectors a second signal proportional to reactor period, switch means actuable responsive to said second signal of a selected magnitude to couple said power source to said drive motor to move said members, servo means actuable responsive to the signal from said first circuit to energize said drive motor to move said member in the direction to reduce said first signal, and a plurality of interlocks interposed between said switch means and said motor, each interlock being open or closed responsive to the occurrence or non-occurrence of a selected condition for reactor operation.

3. A system for automatic start up and control of the power of a nuclear reactor of the type wherein the power is controlled by at least one control rod and each rod is moved by a drive motor, and the power is measured by neutron responsive detectors, comprising: a source of electrical power, a limit switch connected to a first of said detectors and set to open responsive to a signal corresponding to a selected reactor power, first and second parallel groups of interlocks, each of said groups being connected in series between said switch and said motor, a selector switch to open and close one of said first group of interlocks to select manual or automatic operation, respectively, a manual switch for reversing rotation of said motor connected to said second group, a servo system connected to said first group and to said motor to drive said motor responsive to the difference between said selected power and the actual power measured by one of said detectors, at least one reactor period measuring circuit connected to another of said detectors and provided with means coupled to corresponding interlocks in said second group to open said interlocks responsive to a period less than a selected value.

4. A system for automatic start-up and control of the power of a nuclear reactor of the type wherein the power is controlled by at least one control rod and each rod is moved by a drive motor, and the power is measured by neutron-responsive detectors, comprising: a source of electrical power, a limit switch connected to a first of said detectors and set to open responsive to a signal corresponding to a selected reactor power, first and second parallel groups of interlocks, each of said groups being connected in series between said switch and said motor, a selector switch to open and close one of said first group of interlocks to select manual or automatic operation, respectively a manual switch for reversing rotation of said motor connected to said second group, a servo system connected to said first group and to said motor to drive said motor responsive to the difference between said selected power and the actual power measured by one of said detectors, a fission chamber and an ionization chamber disposed in said reactor to monitor the power, respective circuits for deriving the reactor period associated with each chamber, each of said circuits being coupled to one of said interlocks in said second group in a sense to open said interlocks responsive to a period less than a selected value.

5. In a reactor control system, means to automatically initiate withdrawal of neutron-absorber control rods at a selected rate of travel to raise the power of the reactor to criticality, means for deriving independently first and second signals proportional to the reactor period and third and fourth signals proportional to the power of said reactor, a first control means responsive to first and second magnitudes of said first period signal to terminate said withdrawal and to initiate insertion of said rods to regulate the reactor within selected periods, a second control means responsive to said third signal to withdraw or insert said rods substantially simultaneously in the direction to regulate said reactor at a selected power, and a third control means responsive to both said second period signal and said fourth power signals to shut down said reactor when at least one of said second and fourth signals reaches a selected magnitude.

6. A control system for automatic start-up and control of a nuclear reactor of the type wherein the power is controlled by inserting and withdrawing at least one of a plurality of control rods by means of reversible drive motors, comprising: a power source for said motors; a closed servo loop for regulating the power of said reactor comprising a neutron detector, a power supply for said detector, means for generating a first signal corresponding to a selected reactor power, an amplifier coupled to said detector, means for deriving an error signal proportional to the difference between said amplifier output and said first signal, and means responsive to said error signal to couple said power source to said motors in polarity to drive said rods to decrease said error signal; a safety system provided with an electromagnet coupling each rod to its drive motor, current sources for said magnets, means for monitoring reactor power level, means for deriving second and third signals proportional to the reactor period and logarithm of reactor power, and means for decreasing said currents to release said rods responsive to either a selected power level, or a selected period signal; means for deriving fourth and fifth signals proportional to the reactor period and the logarithm of the reactor power; a circuit connecting said power source to said motors to withdraw said rods comprising, in series, a first contact closed only by a master key, a second contact open only responsive to a reverse signal, third and fourth parallel contacts closed only responsive to selected amplitudes of said third and fifth signals, fourth and fifth contacts closed only responsive to selected amplitudes of said second and fourth signals; a circuit connecting said power source to said motors to insert said rods including a plurality of parallel contacts closed respectively by a reverse signal and said error-signal responsive means; and a circuit for generating said reverse signal responsive to receipt of either a period signal shorter than a selected value, a signal proportional to the logarithm of reactor power outside a given range, or a signal proportional to reactor power greater than a selected value.

7. A control system for a reactor comprising a reactor having an active portion, a neutron absorber disposed within the reactor and suspended above the active portion, driving means for moving the absorber towards and away from the active portion of the reactor to alter the flux, a source of power for said driving means, insert and withdrawal control circuits for coupling the source to said driving means to insert or withdraw the absorber, including manually operated means in the withdrawal control circuit to complete its continuity to remove the absorber, and additional means in the withdrawal circuit responsive to the position of rod, and to signals in the count rate, level, and period signal channels of the reactor for interrupting the withdrawal circuit and stop withdrawal of the absorber.

8. A control system for a reactor comprising a reactor having an active portion, a neutron absorber disposed within the reactor adjacent the active portion, driving means for inserting and removing the absorber from the active portion of the reactor to alter the flux, a source of power for said driving means, insert and withdrawal control circuits for coupling the source to said driving means to insert or withdraw the absorber, including manually operated means in the withdrawal control circuit to complete its continuity to remove the absorber, additional means in the withdrawal circuit responsive to the position of rod, and to signals in the count rate, level, and period signal channels of the reactor for interrupting the withdrawal circuit and stop withdrawal of the absorber, and a reversing circuit coupled to the insert control circuit for completing it and reversing the driving means to insert the absorber when signals from the signal channels exceed a predetermined value.

9. A control system for a reactor comprising a reactor having an active portion, a neutron absorbing regulating rod disposed within the reactor adjacent the active portion, driving means for moving the regulating rod towards and away from the active portion to alter the effective flux, a source of power for the driving means, insert and withdrawal control circuits for coupling the source to the driving means to insert or withdraw the regulating rod including a manually controlled servo circuit for controlling the continuity of the insert and withdrawal control circuits, and additional means coupled to the period, log N, and count rate signal channels of the reactor to interrupt the continuity of the withdrawal circuit in response to signals of a predetermined magnitude therein to prevent withdrawal of the rod.

10. A control system for a reactor comprising a reactor having an active portion, a neutron absorbing regulating rod disposed within the reactor adjacent the active portion, driving means for moving the regulating rod towards and away from the active portion to alter the effective flux, a source of power for the driving means, insert and withdrawal control circuits for coupling the source to the driving means to insert or withdraw the regulating rod including a manually controlled servo circuit for controlling the continuity of the insert and withdrawal control circuits, additional means coupled to the period, log N, and count rate signal channels of the reactor to interrupt the continuity of the withdrawal circuit in response to signals of a predetermined magnitude therein to prevent withdrawal of the rod, and a reversing circuit coupled to the insert control circuit for completing it and reversing the driving means to insert the rod when signals from the signal channels exceed a higher predetermined value.

References Cited in the file of this patent

A Package Power Reactor for Remote Locations, AECU–3170, 1955, 204–154.26.

UNITED STATES PATENT OFFICE
CERTIFICATE OF CORRECTION

Patent No. 2,911,344                                              November 3, 1959

Elbert P. Epler et al.

It is hereby certified that error appears in the printed specification of the above numbered patent requiring correction and that the said Letters Patent should read as corrected below.

Column 2, line 8, after "60" insert -- , etc. --; line 10, after "7B" insert -- , etc. --; line 32, after "system" for "of", second occurrence, read -- to --; line 36, beginning with "In considering the" and ending with "through interlocks.", in line 59, same column, should appear as a new paragraph; column 5, line 31, for "Fig. 7A. Contact" read -- Fig. 7A, contact --; column 6, line 6, for "digram" read -- diagram --; lines 25 and 26, strike out "in the log N confidence circuit 89 of Fig. 7A" and insert the same after "relay" in line 26, same column; column 6, line 60, after "withdraw" insert -- the --; lines 60 and 61, for "contact relay R-2 is energized and" read -- relay R-2 is energized and contact --; line 74, for "of the" read -- if the --; column 7, line 26, for "and indicated" read -- as indicated --; lines 52 and 53, strike out "as indicated in the legend of Fig. 4F," and insert the same before "or", second occurrence, line 53; column 8, line 34, after "R5" and before the period insert -- of the reverse circuit 31 of Fig. 7A --; line 35, after "contact" insert -- IC-6 --.

Signed and sealed this 31st day of May 1960.

(SEAL)
Attest:
KARL H. AXLINE
Attesting Officer

ROBERT C. WATSON
                                                                        Commissioner of Patents